(12) United States Patent
Lim et al.

(10) Patent No.: US 6,383,259 B1
(45) Date of Patent: May 7, 2002

(54) TWO SECTION GAS PURIFIER WITH JOULE-THOMPSON COOLING DEVICE

(75) Inventors: Kye-Jin Lim, Seoul (KR); Dan Weber, Atascadero, CA (US); Gwon Sagong, Seoul (KR)

(73) Assignee: C&M Incorporated, Kyungki-do (KR)

( * ) Notice: Subject to any disclaimer, the term of this patent is extended or adjusted under 35 U.S.C. 154(b) by 0 days.

(21) Appl. No.: 09/652,277

(22) Filed: Aug. 30, 2000

(51) Int. Cl.[7] .............................................. B01D 53/02
(52) U.S. Cl. .............................. 95/90; 95/115; 95/116; 95/141; 96/108; 96/126; 96/135
(58) Field of Search .................. 95/90, 115, 116, 95/141; 96/108, 126, 135

(56) References Cited

U.S. PATENT DOCUMENTS

| | | | |
|---|---|---|---|
| 4,996,002 A | 2/1991 | Sandrock et al. | 252/181.6 |
| 5,172,066 A | 12/1992 | Succi et al. | 324/693 |
| 5,238,469 A | 8/1993 | Briesacher et al. | 95/115 |
| 5,961,750 A | 10/1999 | Boffito et al. | 148/442 |
| 5,985,007 A | * 11/1999 | Carrea et al. | 96/126 |
| 6,013,195 A | 1/2000 | Corazza et al. | 252/181.1 |

* cited by examiner

*Primary Examiner*—Robert A. Hopkins
(74) *Attorney, Agent, or Firm*—Thomas Schneck; Gina McCarthy

(57) ABSTRACT

The invention relates to an improved apparatus for thermal management in a gas purification process. As known in the prior art, a gas purification apparatus includes a two-section unitary vessel, wherein the primary section includes an impure gas inlet and a heating assembly and the secondary section includes a cooling device and an outlet for purified gas. Within the primary and secondary sections of the vessels are gas sorbing materials such as getters for removing impurities from the gas to be purified. A feature of the present invention is the continuous, serpentine shape of the gas purification vessel which allows for a longer residence time of the gas and a more efficient purification process. Another feature of the invention is a Joule-Thomson cooling device which divides the primary section of the vessel from the secondary section. The Joule-Thomson cooling device cools the secondary section of the vessel and the gas contained within it. The secondary section contains getter materials used to capture remaining hydrogen. An additional feature of the invention is the use of a heated high performance particle filter at a location near the outlet of the gas purification vessel.

14 Claims, 2 Drawing Sheets

TWO SECTION GAS PURIFIER WITH JOULE-THOMPSON COOLING DEVICE

BACKGROUND OF THE INVENTION

In industrial processes, such as the manufacture of semiconductor devices, commercial inert gases are used. These inert gases have traces of impurities which must be removed during the industrial process. Inert gas purifiers are known which use impurity gas sorbing materials such as "getters" to remove the impurities.

For example, U.S. Pat. No. 6,013,195 to Corazza et al., U.S. Pat. No. 5,961,750 to Boffito et al. and U.S. Pat. No. 4,996,002 to Sandrock et al. provide examples of gas sorbing materials. Specifically, U.S. Pat. No. 6,013,195 to Corazza et al. describes getter materials capable of being activated at low temperatures. The patent describes compositions including a getter component having Zr, V and Fe and an activator component. U.S. Pat. No. 5,961,750 describes nonevaporable getter alloys containing Zr, Co, and a third component. Additionally, U.S. Pat. No. 4,996,002 provides a method of manufacturing tough porous getters, of high Zr-content Zr—V alloys that have minor additions of elements such as Fe, Ni, Mn and/or Al. Getter materials are used in conjunction with gas purifiers.

A typical gas purifier is described in U.S. Pat. No. 5,172,066 to Succi et al. The purifier has an impure gas inlet in fluid communication with a housing that contains a gas sorbing material or getter materials. The housing is also in fluid communication with a gas outlet through which purified gas passes. A resistance heater wrapped around the housing maintains the temperature within the cylinder at 400° C. The gas purifier housing in this patent is described as being in the form of a stainless steel cylinder. A disadvantage in using a gas purifier having a simple cylindrical housing is that the cylinder does not provide a sufficient gas residence time within it for optimal removal/retention of impurities.

U.S. Pat. No. 5,238,469 to Briesacher et al. describes a gas purification system for the purification of noble gases and nitrogen. Here, as above, an impure gas is heated within a cylindrical housing and the impure gas is contacted with an impurity sorbing material for removing impurities and producing a purified gas. Additionally, it is described that the purified gas is cooled to a temperature of less than about 100° C. and then contacted with a hydrogen sorbing material to remove residual hydrogen. Preferably, in the prior art, the hydrogen sorbing material is used at temperatures ranging from ambient temperature to about 40° C. The patent describes two types of heat exchangers for cooling the purified gas.

Both coiled heat exchangers and parallel tube heat exchangers are described. The heat exchangers are described as being located within a vessel separate from the cylindrical housing, however, it is known in the art that the heat exchanger may be located within the same housing as the heater. Disadvantages of the external coiled heat exchangers, as described in the patent, are that they are bulky and energy draining. Additionally, the coiling of the exchanger can interfere with the finished surface causing production of particulates by the coil itself.

Furthermore, in the prior art, high performance filters are known to be used in conjunction with the gas purification process. These filters are used at ambient temperatures. On contact with the ambient temperatures, the filters tend to trap moisture leading to contamination.

Therefore, it is an object of the present invention to provide an improved apparatus for thermal management for use in a gas purification process at least by 1) increasing the residence time of the gas within the apparatus in order to optimize the purification efficiency, 2) decreasing the amount of energy used in the process and 3) decreasing the amount of contamination produced by the apparatus.

SUMMARY OF THE INVENTION

The invention provides an improved apparatus for thermal management in a gas purification process. The apparatus of the present invention includes a two section purifier wherein the two sections are joined in a unitary vessel. A feature of the present invention is a single continuous serpentine shape that makes up the unitary purifier vessel. The continuous serpentine shape provides the vessel with an aspect ratio such that the vessel may provide optimal conditions for the retention/removal of impurities within a gas. The serpentine shape also allows for increased residence time of the gas within the purifier, therefore, increasing the purification efficiency. The purifier vessel has a primary section that is separated from a secondary section by a Joule-Thomson cooling device, another feature of the present invention.

As is known in the art, during a first stage of the gas purification process, a heater assembly coupled to the purifier vessel heats an impure gas, such as a noble gas. The heated impure gas enters the purifier vessel by way of a purifier inlet. Alternatively, the heating assembly may be eliminated and the gas may be heated within the vessel. Within the purifier vessel is an impurity gas sorbing material such as getters or getter "pills". The getters are heated to an optimal temperature usually, 400–450° C. At this temperature the getters become active as a chemical pump. Typical impurities within a noble gas include $O_2$, $H_2O$, CO, $CO_2$, $H_2$, $N_2$ and $CH_4$. These impurities react with the surface area of the getter pills to form solid compounds. These compounds are primarily oxides, carbides and nitrides of the base getter material, which is for example $Zr_2O_3$ Hydrides are also formed and are contained within the bulk of the getter pills in the form of a solid solution. Hydrogen may escape from the hydride formed as well as from the surfaces of the gas purifier in the heated primary section of the vessel. Therefore, a "cool zone" within the secondary section of the purifier vessel is required to capture the released hydrogen. In the prior art the cool zone is known to be within the range of less than 100° C. to ambient temperatures.

A further feature of the invention is the Joule-Thomson cooling device, dividing the primary section of the purifier vessel from the secondary section and providing a temperature range of approximately less than 200° C. and greater than about 100° C. within the secondary section of the vessel. The Joule-Thomson cooler is known in the art, however, it is not known to be used in conjunction with inert gas purifiers. The Joule-Thomson cooler causes gas pressurization in the primary section of the vessel, and gas expansion or cooling after the gas flows from the primary section to the secondary section.

Coupled to the secondary section of the purifier vessel is a further feature of the invention. Within the secondary section of the vessel, near a purifier vessel outlet, a sintered metal high performance particle filter is found. High performance particle filters are known in the art, however, are not known to be located at the outlet end of a purifier vessel of a gas purifying device where they are heated, as is provided in the present invention.

DETAILED DESCRIPTION OF THE INVENTION

Figure 1:
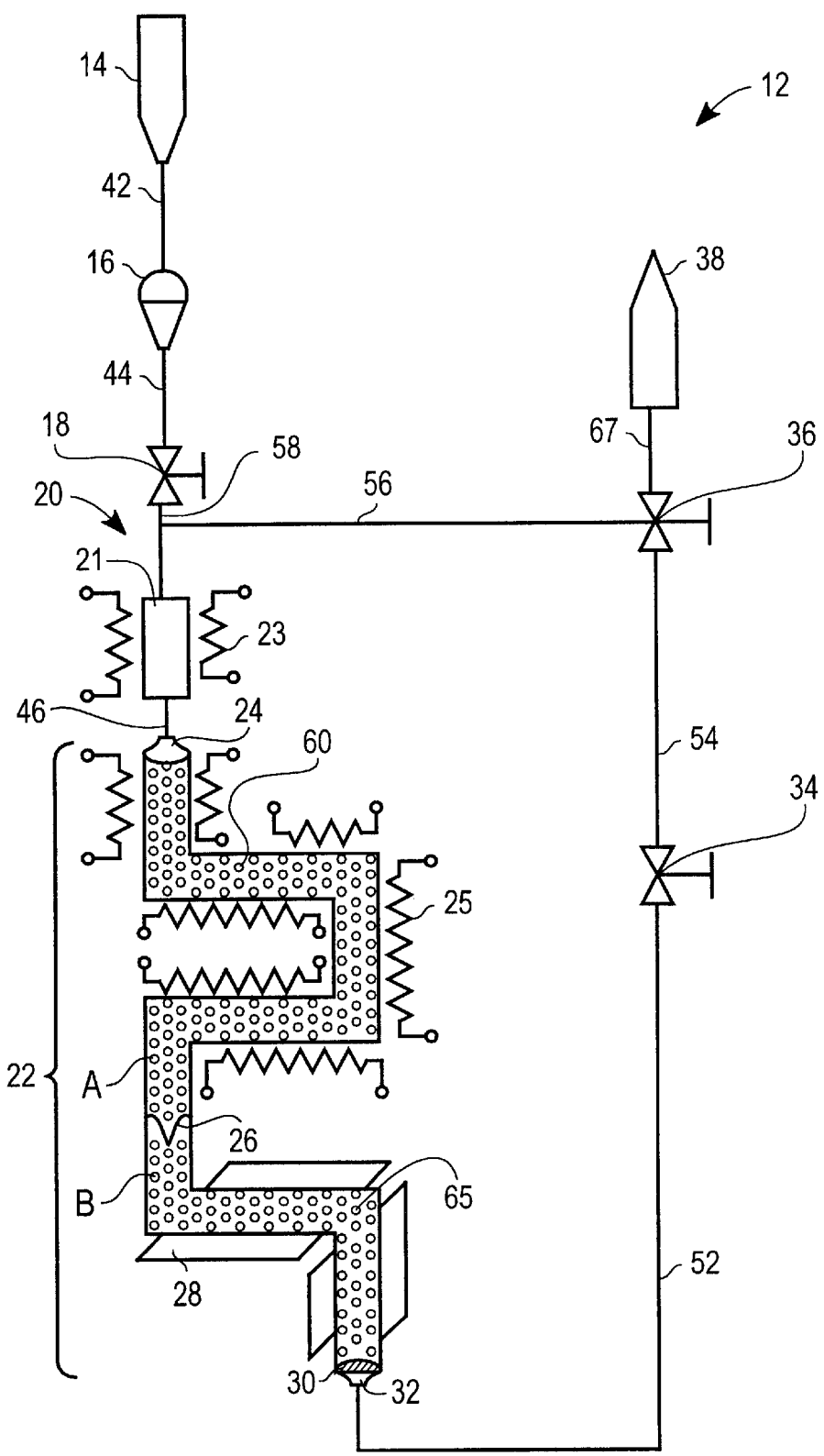
FIG. 1 is a schematic of a gas purification system featuring a gas purifying vessel in accordance with the present invention.

As illustrated in FIG. 1 a gas purification system 12 in accordance with the present invention includes a gas inlet 14, a mass flow meter 16, an inlet valve 18, a heater assembly 20, a purifier vessel 22, a purifier inlet 24, a heating cartridge 25, a Joule-Thomson cooling device 26, aluminum heating fins 28, a sintered metal porous filter 30, a purifier outlet 32, an outlet valve 34, a bypass valve 36 and a gas outlet 38. Tubing 52 connects the purifier outlet 32 to the inlet valve 34. Tubing 56 connects the bypass valve 36 to tubing 58 as seen in FIG. 1.

The unitary purifier vessel 22 is a continuous structure that is serpentine in shape. The serpentine shape of the vessel provides an optimal aspect ratio and allows for an increased residence time of the gas within the vessel for optimal removal/retention of impurities. This results in an efficient gas purification process. The vessel is for example, approximately 0.5 meters in length and 2 inches in diameter and includes a primary section A and a secondary section B. The interior surface of the vessel, which is contacted by gas, should be clean and well polished. An example of a material used to make the purifier vessel 22 is stainless steel. The vessel 22 includes welded gas-tight caps at each end, one end including the purifier inlet 24 and another end including the purifier outlet 32.

A source of impure gas (not shown) is coupled to the gas inlet 14. Impure gases are for example those gases that contain levels of impurities in the parts per million range. For example, the noble gases Ar, He, Ne, Xe and Kr, containing traces of impurities in the above-stated range are considered to be impure.

Flow meter 16 is coupled to the gas inlet 14 by a length of tubing 42. The meter 16 is used to measure the amount of gas flowing through the system. A control module (not shown) may be electrically connected to flow meter 16 and may be used to monitor the flow of gas. The control module may monitor the total flow of gas that has passed through the purifier vessel 22. In this way, the useful life of the purifier vessel 22 may be tracked as there is a total volume of gas, given a particular impurity level, which can be purified before the vessel 22 must be replaced.

Valve 18 is coupled to flow meter 16 by a length of tubing 44. Impure gas travels from gas inlet 14 through tubing 42, past flow meter 16, through tubing 44, through valve 18 and through tubing 58 to a heating assembly 20.

The heating assembly 20 includes a chamber 21 and an electric heater cartridge 23, electrically powered. The heating assembly 20 heats the gas to a temperature ranging from about 350° C. to 450° C. The heated gas passes from heated chamber 21 through tubing 46 into the purifier inlet 24 of the purifier vessel 22. Alternatively, the heating assembly 20 is not used and the gas travels directly from valve 18, through tubing 58 and 46 into inlet 24 of the vessel 22 where it is heated. A primary section A of the purifier vessel 22 is coupled to a heating cartridge 25 that is electrically powered.

The heating cartridge 25 heats and maintains the temperature of the gas and the primary section A of the vessel 22 containing the gas at a temperature preferably ranging from 400° C. to 450° C.

Within the vessel 22 is a getter material or a gas sorbing material 60. Examples of suitable materials for non-evaporable getters are disclosed in U.S. Pat. Nos. 4,996,002; 5,961,750; and 6,013,195. A specific example of a getter material is a getter "pill" comprising Zr, V and Fe. The specific getter material chosen is based upon the temperature range available and upon the specific impure gas that is about to be purified. Getter materials are typically activated at a temperature of 400–450° C. by the heating cartridge 25. As described by the prior art, the heated gas passes over the surface of the getter materials and impurities such as $O_2$, $H_2O$, CO, $CO_2$, $H_2$, $N_2$ and $CH_4$ are removed from the gas. These impurities react with the surface area of the getter pills to form solid compounds, primarily oxides, carbides and nitrides of the base getter metal. These surface compounds are continuously diffused into the getter pill bulk by the process of bulk diffusion. The bulk diffusion occurs when the getters are activated by heat. Hydrides are also formed as the impurities react with the surface area of the getter pills and are contained within the bulk of the getter pills in the form of a solid solution.

With changes in temperature, pressure and/or hydrogen concentration the formation of the hydride may be reversed and hydrogen released from the hydride. Additionally, due to the heat within the primary section of the purifier vessel 22, hydrogen may be released from the stainless steel surface of the vessel. Cooling of the secondary section B of the purifier vessel 22 is necessary for preventing the gas from picking up trace hydrogen that was captured by the formation of the hydride and released from the hydride or never captured at all.

Figure 2A:
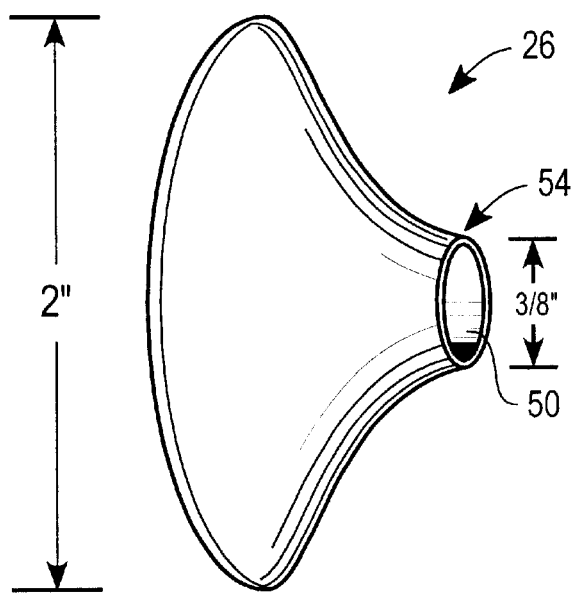
FIG. 2a is a side view of a Joule-Thomson cooling device found in the gas purifying vessel shown in FIG. 1.
Figure 2B:
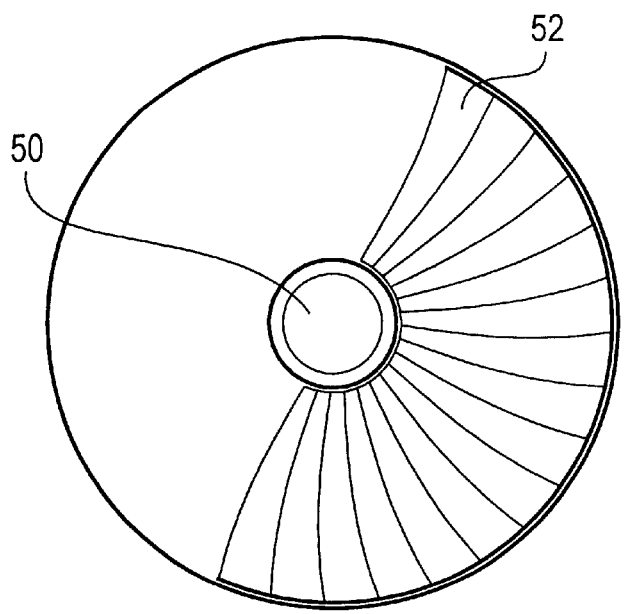
FIG. 2b is a front view of the Joule-Thomson cooling device found in the gas purifying vessel shown in FIG. 1.

Before the gas exits the purifier vessel 22, it is cooled by the Joule-Thomson cooling device 26, pictured in FIG. 1 and pictured in detail in FIG. 2. The device 26 is pictured in FIG. 1 as being located at a point approximately halfway through the purifier vessel 22. However, it may be located at any desirable point along the vessel. The Joule-Thomson device 26 is an integral part of the vessel 22. It is welded into the vessel as a pseudo-"end-cap" of the primary section A of the vessel 22. The cooling device 26 defines a boundary where the purifier vessel 22 is divided into the primary section A and the secondary section B. The secondary section B is welded to the primary section A, encapsulating the cooling device 26 within. An advantage of using an internal cooling device 26 is that the need for external cooling, which can be bulky or energy draining is minimized.

The device 26 includes compartments 52 through which the gas passes to enter into a nozzle 54 having a flow constricting orifice 50. The nozzle, having the orifice 50, approximately ⅜" long, divides the primary section A of the vessel 8 from the secondary section B of the vessel 8. The device 26 causes gas pressurization/compression within the primary section of the vessel 22, near the orifice 50. Characteristics of the gas used, determine the pressure needed to reach a desired cooling temperature. Cooling or expansion of the gas occurs as the gas internally flows from the primary section of the vessel across the orifice 50 into the secondary section B of the vessel. The expansion energy that the gas produces as it expands is used to produce the cooling effect.

The secondary section B of the vessel 22 and the gas within it are cooled to a temperature range which is less than about 200° C. with the Joule-Thomson cooling device 26 and greater than ambient temperature. Preferably the temperature range is less than about 200° C. and greater than about 100° C. Additionally, aluminum heat radiating fins 28, attached to purifier vessel 22 (FIG. 1) or other cooling structures, assist in maintaining the cool zone of the secondary section B of the purifier vessel 22.

Also present in the secondary section B of the purifier vessel 22 are non-evaporative sorbing materials 65. In particular, materials for sorbing hydrogen that was not captured in the primary section or that was captured and re-released in vessel 22 are provided. Hydrogen gas entering the second stage or released in the second stage forms a hydride as it reacts with the surface of the getter pills. Hydrides are contained within the bulk of the getter pills in the form of a solid solution. Not only are hydrides formed, but they are retained in solid solution since the temperature in section B is too low to support the release of hydrogen. The Joule-Thomson cooler 26 is employed to provide a temperature within the secondary vessel B that is low enough to retain the formation of hydrides, but that is preferably greater than ambient temperature.

At the outlet end of the vessel, coupled to the outlet 32 and shown in FIG. 1, is the sintered metal particle filter 30. The filter is a high performance filter, intended for application of final filtration and designed to remove from the gas particulate matter 0.003 micron in size or larger. The sintered metal filter may be welded to the vessel 22. Alternatively, the filter 30 may be a Teflon filter located downstream of the vessel 22.

In the prior art, high performance filters are found, both within a purification vessel and at a location downstream of the purification vessel. In both locations, the purified gas is at an ambient temperature. The high performance filter is used in combination with the ambient temperature and is not heated. The filter, on contact with the ambient temperature, or due to backstreaming, traps moisture. The trapped moisture can lead to contamination. Ideally, a filter membrane should be heated continuously in order to maintain a "dry down" condition.

In the present invention, the filter 30 is placed immediately downstream of the purification process, i.e. it is placed in the secondary section B of the vessel 22 near the outlet 32 so as to apply a final filtration. As mentioned, the temperature of the secondary section B, maintained by the Joule-Thomson cooling device, is about less than 200° C. and preferably greater than about 100° C. This temperature is low enough so as to prevent hydrogen from escaping from the hydride material formed in conjunction with the getter. However, it is also high enough, unlike the prior art ambient temperatures used, so that it will act to continuously dry down the filter, preventing moisture from becoming trapped within the filter. From filter 30 and outlet 32, the gas travels through tubing 52 past valves 34 and 36 (if bypass function not chosen), through tubing 67 and through gas outlet 38.

The gas that entered the vessel 22 with levels of impurities in the parts per million range, typically exits the vessel through the purifier outlet 32 and final outlet 38 with levels of impurities in the parts per billion or parts per trillion range. Gases with levels of impurities in the parts per billion range, are suitable for use in many industrial processes.

What is claimed is:

1. A gas purification system comprising:
   gas inlet means for impure gas;
   a purifier coupled to said gas inlet means said purifier including,
     a purifier inlet for impure heated gas,
     a primary section coupled to said inlet,
     a secondary section coupled to said primary section,
     gas sorbing materials within said primary and secondary sections capable of removing impurities from said impure gas to produce a purified gas, and
     a purifier outlet for purified gas coupled to said secondary section;
   a Joule-Thomson cooling device coupled to said purifier for cooling said purified gas to a temperature less than about 200° C. and greater than about 100° C. whereby said cooling device separates said primary and secondary sections;
   a gas outlet for said purified gas.

2. The gas purification system of claim 1 further comprising heating means coupled to said gas inlet means for heating said impure gas.

3. The gas purification system of claim 1 further comprising a heated filter coupled to said purifier outlet means whereby said filter is heated by said temperature within said secondary chamber.

4. The gas purification system of claim 3 wherein said filter is capable of filtering particles greater than about 0.003 micron in size.

5. The gas purification system of claim 4 wherein said filter is a sintered metal filter.

6. The gas purification system of claim 1 further comprising a teflon filter located downstream of said purifier.

7. The gas purification system of claim 1 further comprising aluminum fins coupled externally to said secondary section between said cooling device and said outlet.

8. The gas purification system of claim 1 wherein said purifier is serpentine in shape.

9. The gas purification system of claim 1 wherein said primary section is welded to said secondary section.

10. The gas purification system of claim 1 wherein said Joule-Thomson cooling device is welded to said purifier.

11. The gas purification system of claim 1 wherein said gas sorbing materials include non-evaporative getter materials.

12. A method for removing impurities from a gas comprising the steps of:
   (a) heating an impure gas;
   (b) contacting the heated impure gas with an impurity sorbing material in a vessel to produce a purified gas having trace amounts of residual hydrogen;
   (c) cooling the purified gas to a temperature less than about 200° C. and greater than 100° C. with a Joule-Thompson cooling device coupled to said vessel; and
   (d) contacting the purified gas with a hydrogen sorbing material to at least partially remove said residual hydrogen.

13. The method of claim 12 further comprising:
   (e) filtering the purified gas with a filter capable of filtering particles greater than about 0.003 micron in size wherein said filter is continuously heated by said temperature produced by said Joule-Thomson cooling device.

14. The method of claim 12 further comprising increasing the residence time of said gas within said vessel by employing a vessel having a serpentine shape.

* * * * *